United States Patent [19]
Miyoshi et al.

[11] Patent Number: 4,567,063
[45] Date of Patent: Jan. 28, 1986

[54] PROCESS FOR PRODUCING MAGNETIC RECORDING MEDIA

[75] Inventors: Takahito Miyoshi, Odawara; Toshimitu Okutu, Minami-Ashigara; Masahiro Utumi, Hadano; Masaaki Fujiyama, Minami-Ashigara, all of Japan

[73] Assignee: Fuji Photo Film Co., Ltd., Ashigara, Japan

[21] Appl. No.: 727,216

[22] Filed: Apr. 25, 1985

[30] Foreign Application Priority Data

Apr. 27, 1984 [JP] Japan ................................. 59-83693

[51] Int. Cl.$^4$ ........................ H01F 10/00; B05D 5/12
[52] U.S. Cl. .................................................. 427/128
[58] Field of Search ........................................ 427/128

Primary Examiner—Bernard D. Pianalto
Attorney, Agent, or Firm—Burns, Doane, Swecker & Mathis

[57] ABSTRACT

A process for the production of magnetic recording media including a nonmagnetic support having a magnetic layer on one side thereof, and a backing layer obtained by dispersing a filler in a binder on the other side thereof, in which said backing layer is provided by:
a first step of kneading and dispersing a filler and a binder by means of a roll mill to form chips,
a second step of dissolving said chips in a solvent followed by dispersion effected with a sand grinder, and
a third step of adding a curing agent to the obtained liquid dispersion, followed by coating.

11 Claims, No Drawings

PROCESS FOR PRODUCING MAGNETIC RECORDING MEDIA

FIELD OF THE INVENTION

The present invention relates to a magnetic recording medium and, more particularly, to a process for producing a magnetic recording medium having improved electromagnetic conversion properties, low coefficients of friction and excellent running durability.

BACKGROUND OF THE DISCLOSURE

In the magnetic tapes for the audio, video or computer purpose, in general, there is recently an increasing demand for high-density recording, so that the particle size of the conventional Co-containing magnetic iron oxides becomes finer.

Attention is also paid to the ferromagnetic metal thin-film type magnetic recording media, which rely upon ferromagnetic alloy powders, or are formed by the vapor deposition techniques such as vacuum deposition, sputtering and ion plating, and such media have been put to practical use.

In such audio, video or computer magnetic tapes, the magnetic layers are finished to a certain smoothness to improve the sensitivity (especially output in a high-frequency range). In some cases, however, improvements in sensitivity could not be introduced even with the magnetic layers having a smoothly finished surface, since the irregularity of the backing layers is transferred thereto.

In recent years, the total thickness of magnetic tapes tends to be reduced as much as possible, and is in most cases no higher than about 20 microns.

This is accompanied by a reduction in the thickness of the associated backing layers, and often causes that they are coated in a thickness of no higher than 2 microns. For that reason, wear of the backing layers is likely to occur.

Thus, the reduction in the total thickness of the magnet tapes is accompanied by a drop in the strength thereof, and have adverse influences upon running characteristics, running durability, taking-up characteristic, output variations, etc.

SUMMARY OF THE INVENTION

A main object of the present invention is to smoothen the surface of a backing layer to be formed on a nonmagnetic support, whereby the transfer of the irregularity of that surface to a magnetic layer is reduced or limited to improve the S/N ratio.

More specifically, according to the process for the production of magnetic recording media of the present invention, a filler and a binder constituting the starting material for the backing layer are kneaded and dispersed by means of a roll mill to obtain chips. Subsequently, the chips are dissolved in a solvent and dispersed therein by a sand grinder. A curing agent is added to the resulting liquid dispersion, and the resultant mixture is coated onto the side of the nonmagnetic support which is opposite to the magnetic layer.

DETAILED DESCRIPTION OF THE PREFERRED EMBODIMENTS

A combination of the binder with the curing agent to be used in the present invention may suitably be selected out of those known as used in the backing layers for magnetic recording media in the art, and the filler to be used may be selected out of those known in the art in the predetermined amount, depending upon the required properties. The solvents to be employed in the respective steps may be used depending upon the binder and curing agent selected.

As the roll mill, a three-roll mill may be employed, which has ordinarily be used for the production of, e.g., glossy paints. Roll milling with such a mill is repeated until the filler and binder are gradually cured or hardened finally becoming solid chips. Thereupon it is desired that the solvent remains partly in the chips in an amount of 1 to 11% by weight, preferably 3 to 10% by weight.

After the filler and binder to form the backing layer has previously been put into a dispersed state as the solid chips containing a predetermined amount of solvent, they are dissolved in a solvent and dispersed therein by using the sand grinder to form a liquid dispersion. Thus, it is possible to disperse the filler uniformly and at an early stage during the dispersing operation of the sand-grinder. Consequently, uniform mixing of the curing agent with the resulting mixture comprised of the filler, etc. can easily and rapidly be effected at the third step. This is the reason why, when the liquid dispersion is coated onto the nonmagnetic support, the filler is uniformly dispersed in the surface of the backing coating layer, thus resulting in a smoothly finished surface having reduced or limited irregularity. As a result, it is possible to decrease the transfer of the irregularity of the backing layer to the magnetic layer due to unsatisfactory dispersion of the filler such as carbon black, etc. and, hence, to eliminate the drawbacks such as a lowering of the S/N ratios, etc.

Carbon black frequently used as the filler is so poor in dispersibility that the particles tend to be dispersed in a agglomerated or coalesced in a chain-like state. Only with the conventional mixing technique, it is difficult to destroy the particles in such a agglomerated state and disperse them uniformly. According to the present invention, however, dispersion and kneading take place in such a manner that the binder is rubbed against the particles under the action of shearing force in the process of roll mill chipping, whereby the agglomerated particles of carbon black, etc. are dispersed uniformly.

By allowing the predetermined amount of solvent to remain in the chips, it is also possible to rapidly obtain a uniform mother liquid dispersion in the next step wherein they are dispersed with a solvent by means of the sand grinder.

The fillers used for the backing layers of the magnetic recording media according to the present invention may include inorganic powders such as carbon black, graphite, titanium oxide, barium sulfate, ZnS, $MgCO_3$, ZnO, $Fe_3O_4$, $SnO_2$, $SiO_2$, $Cr_2O_3$, alpha-$Al_2O_3$, SiC, etc. Among others, preference is given to carbon black, graphite, titanium oxide, barium sulfate, $CaCO_3$, etc.

As the binders for the backing layers, use may be made of those known in the art such as, for instance, thermoplastic resins, thermosetting resins, reactive type resins or mixtures thereof, which may be used in combination with the curing agent.

The thermoplastic resins used may include vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylronitrile copolymers, polyamide resins, polyvinyl butyrals, cellulosic resins (cellulose acetate butylate, cellulose diacetate, cellulose propionate, nitrocellulose, etc.), styrene-butadiene copolymers, polyester resins, chlorovinyl ether-acrylate copolymers, amino resins, various rubber base resins, etc.

The thermosetting or reactive type resins used may embrace phenol resins, epoxy resins, polyurethane setting type resins, urea resins, melamine resins, alkyd resins, acrylic reactive resins, polyisocyanates, polyamines, etc.

Among others, the most preference is given to three-component systems of cellulosic resins, thermoplastic polyurethane elastomers and polyisocyanates.

The cellulosic resins used may suitably be cellulose derivatives such as nitrocellulose, and serve to impart heat resistance, toughness and anti-blocking properties.

As the thermoplastic polyurethane elastomers, use may substantially be made of almost all the commercially available products. More specifically, use may be made of polyester-polyurethane resins and polyether-polyurethane resins prepared by the urethanation of polyester-polyols obtained by the reaction of organic dibasic acids (such as phthalic acid, adipic acid, dimerized linoleic acid or maleic acid) with glocols (such as ethylene glycol, propylene glycol, butylene glycol or diethylene glycol) or polyvalent alcohols (such as trimethylol-propane, hexanetriol, glycerin, trimethylol-ethane or pentaerythritol) with the use of polyisocyanate compounds such as tolylene-diisocyanate, 4,4'-diphenylmethane-diisocyanate, hexamethylene-diisocyanate or m-xylylene-diisocyanate; as well as resins having a

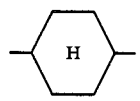

ring in the molecular skeleton and expressed in terms of the general formula (I):

[—O—R—OOC—R'—CO)$_m$—OROOCNH—R'—'—NHCO—]  (I)

(wherein m is an integer of 5 to 100; R represents a divalent alicyclic or aromatic residue having at least two hydroxyalkyl or hydroxyalkoxyl groups having 1 to 4 carbon atoms; R' represents

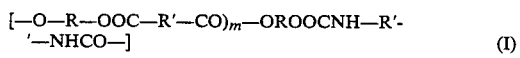

R" represents

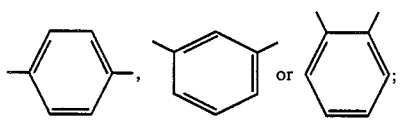

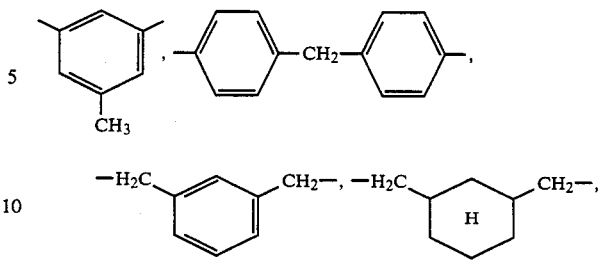

or —CH$_2$—$_n$ (n is an integer of 4–6).

The molecular weight of such elastomers is effectively 5,000 to 500,000, preferably 10,000 to 200,000. These polyurethanes are disclosed in Japanese Patent Kokai-Publication NO. 55-122234.

Polyisocyanates which may be used in the present invention are 2,4-tolylene-diisocyanate, 1,6-hexabutylene-diisocyanate, triisocyanate (e.g., "Colonate L" manufactured by Nippon Polyurethane Co., Ltd.), etc.

The curing agents used may generally be polyisocyanates, and the binders used may preferably be those containing OH groups, since they undergo a cross-linking reaction with the curing agents. However, it is not always required to use any binder undergoing a cross-linking reaction with the curing agents, unless they comply with the required properties.

As the curing agents having a OH group in the molecule, mentioned are polyurethane resins, polyester resins, vinyl chloride-vinyl acetate base copolymers, etc., or mixtures thereof. The preferred binders are cellulosic resins and mixtures thereof with polyesters and/or polyurethanes. More preferable are binders wherein nitorcellulose is used as the cellulosic resin and in the form of a mixture with at least 50% by weight of a polyester and/or a polyurethane.

The polyisocyanate serving as the curing agent is preferably in an amount of 10 to 50 parts by weight per 100 parts by weight of the binder (binder+curing agent).

In the backing layer according to the present invention, the ratio of the inorganic powder to the binder used is in a range of 4/1 to 0.1/1 by weight.

A P/B ratio (by weight) in the first step using the three-roll mill, wherein P is the total weight of the filler (inorganic powder) including carbon black, and B is the weight of the binder, is 100/100 to 100/10, preferably 100/90 to 100/20. In the second step where sand grinding dispersion is applied, the P/B ratio is 1/0.5 to 1/3.5 (preferably 1/0.6 to 1/2.5), at the time the chips obtained by roll milling are dissolved in a solvent.

In the first step, a P/B ratio exceeding 100/10 (i.e., a higher content of filler) results in unsatisfactory mixing of binder for lack of binder, whereas a P/B ratio of smaller than 100/100 results in insufficient chip-forming effect being produced.

Each suitable amount of solvent may be used in the respective steps. In the first step, a weight ratio of solvent to binder is preferably 2/1 to 6/1, and the solvent is incorporated in such a manner that the binder liquid has a viscosity of about 3000 to 70,000 cP at the beginning. In the second step, the amount of solvent is 300 to 1100 parts by weight per 100 parts by weight of the filler.

The backing layer of the present invention is selected such that the total thickness of the magnetic recording medium (magnetic layer+support+backing layer) is to be reduced as much as possible with a view to increasing the recording density per unit volume. Such a backing layer has a thickness of preferably up to 2 microns, more preferably 0.3 to 1.5 microns.

In the present invention, the backing layer has an average center line surface roughness (Ra) of no more than 0.10 micron, as measured under a cut-off of 0.08 mm.

According to the present invention, the magnetic recording media having the above mentioned characteristics are obtained. In the prior art techniques, however, if the backing layer is made thin, the transfer of the irregularity of the backing layer to the magnetic layer tends to occur easily. It is to be understood that the present invention is free from such a defect. In addition, by using the backing layer of the present invention, the video S/N characteristics are not deteriorated even in high density recording with a recording wave length of 1.3 microns.

The magnetic recording media, esp., the magnetic layers, of the present invention may be prepared basically according to the manner and with the materials disclosed in U.S. Pat. No. 4,135,016 corresponding to Japanese Patent Kokai-Publication No. 52-108,804 except for the purport and details disclosed herein. The support material may be selected from those known in the art with the compatibility and other required properties in mind.

The magnetic layers used in the present invention may be ones using any one of gamma-iron oxides or iron oxides modified with Co, ones obtained by dispersing and coating ferromagnetic metal powders into binders, or ones comprised of thin-film layers of magnetic metals.

The present invention will now be explained in further detail with reference to the following non-restrictive examples, wherein "part" means "part by weight".

EXAMPLES

A polyethylene terephthalate base support of 14 microns in thickness was applied on one side with a magnetic layer including Co-containing magnetic iron oxide and on the other side with a backing layer.

The magnetic layer was applied such that its thickness reached 5 microns after drying. The backing layer was applied in the following manner. A mixture having the following composition was treated six passes with a three-roll mill.

| | |
|---|---|
| Carbon Black (with a mean particle size of 40 | 100 parts |
| Binder (Table 1) | 60 parts |
| Methyl Ethyl Ketone | Given Amount (see Table 1) |

The chips having the above-mentioned composition obtained by the three-roll mill treatment were treated for a residence time of 60 minutes at a supply flow rate of 15 kg/min according to the following recipe and with the use of a sand grinder.

| | |
|---|---|
| Roll-Milled Chips | 160 parts |
| Polyurethane (N-2304-trade name-manufactured by Nippon Polyurethane Co., Ltd) | 40 parts |
| Methyl Ethyl Ketone | 700 parts |

After dispersing of the aforesaid composition, 40 parts of polyisocyanate (Colonate L—trade name—manufactured by Nippon Polyurethane Co., Ltd) were added as the curing agent to form a coating liquid for the backing layer, which was in turn coated to a thickness of 1 micron, as measured after drying.

COMPARISON EXAMPLE 7

| | |
|---|---|
| Carbon Black (with a mean particle size of 40 | 100 parts |
| Nitrocellulose | 50 parts |
| Polyurethane (N-2304-trade name-manufactured by Nippon Polyurethane Co., Ltd) | 50 parts |
| Methyl Ethyl Ketone | 700 parts |

The starting materials were treated for a residence time of 60 minutes at a supply flow rate of 15 kg/min with the use of a sand grinder. 40 parts of polyisocyanate (Colonate L—trade name—manufactured by Nippon Polyurethane Co., Ltd.) were added as the curing agent to the thus obtained product to form a coating liquid for the backing layer, which was in turn coated to a thickness of 1 micron, as measured after drying.

The products obtained in the examples and comparison example were slitted to a thickness of ½ inch for the following testings. The results are shown in Table 1.

MEASUREMENT OF COLOR S/N RATIO

The measuring device used was a noise meter (925C) manufactured by Shibatsuku Co., Ltd, and Sample No. 5 was used as the reference tape (0 dB). Differences in the S/N ratio of Sample Nos. 1–4 and 6–7 with respect to the reference tape were measured.

Measurement was also conducted with a high pass filter of 10 kHz AM and a low pass filter of 500 kHz AM. The VTR used was NV-8300 manufactured by Matsushita Electric Industiral Co., Ltd.

According to the present invention, the filler and binder are previously kneaded to form chips, upon or before the backing layer is applied on the nonmagnetic support. Thus, mixing of the filler with the binder is uniformized. The thus obtained chips having satisfactory dispersibility are dissolved in a solvent, and the resulting dispersion is added with the curing agent to obtain a mixture. By coating the mixture onto the support, there are obtained the effects that the backing layer is smoothened, and the S/N ratio is improved.

It is understood that any modification may be done without departing from the gist of the present invention as disclosed and claimed hereinbelow.

TABLE 1

| | Type of binder during kneading with three-roll mill (parts by weight) | Amount of Methyl Ethyl Ketone during kneading with three-roll mill (parts by weight) | Amount of solvent remaining in chips during kneading with three-roll mill (parts by weight) | Color S/N (dB) |
|---|---|---|---|---|
| Sample No. | | | | |
| 1 | $\frac{\text{Nitrocellulose}}{\text{Polyester *1}} = \frac{5}{1}$ | 200 | 3 | +4.0 |

TABLE 1-continued

| | Type of binder during kneading with three-roll mill (parts by weight) | Amount of Methyl Ethyl Ketone during kneading with three-roll mill (parts by weight) | Amount of solvent remaining in chips during kneading with three-roll mill (parts by weight) | Color S/N (dB) |
|---|---|---|---|---|
| 2 | Nitrocellulose | 200 | 3 | +3.3 |
| 3 | $\frac{\text{Nitrocellulose}}{\text{Polyurethane *2}} = \frac{5}{1}$ | 200 | 3 | +3.3 |
| 4 | Nitrocellulose | 400 | 11 | +1.0 |
| 5 | Polyurethane *2 | 200 | 3 | ±0 |
| 6 | Nitrocellulose *3 | 140 | 0.5 | +1.0 |
| Comparison Example 7 | | 700 | — | −2.0 |

*1 Trade Name: Stafix Fuji Photo Film Co., Ltd.
*2 Trade Name: N-2304 Nippon Polyurethane Co., Ltd.
*3 The starting material having the same final composition as in No. 1 was immediately sand-ground to form paint which was coated in the same manner as in No. 1.

What is claimed is:

1. A process for the production of magnetic recording media including a nonmagnetic support having a magnetic layer on one side thereof, and a backing layer obtained by dispersing a filler in a binder on the other side thereof, in which said backing layer is provided by:
   a first step of kneading and dispersing a filler and a binder by means of a roll mill to form chips,
   a second step of dissolving said chips in a solvent followed by dispersion effected with a sand grinder, and
   a third step of adding a curing agent to the obtained liquid dispersion, followed by coating.

2. A process as defined in claim 1, wherein said chips comprises 1-11% by weight of solvent.

3. A process as defined in claim 2, wherein said chips comprises 3-10% by weight of solvent.

4. A process as defined in claim 1, wherein said kneading to form chips is carried out by repeating passing the mixture of the filler and binder through the roll mill.

5. A process as defined in claim 1, wherein the weight ratio of the filler (P) to the binder (B) (P/B ratio) is 100/100 to 100/10 in the first step.

6. A process as defined in claim 5, wherein the P/B ratio is 100/90–100/20.

7. A process as defined in claim 5, wherein the P/B ratio after the dissolving in the second step is 1/0.5 to 1/3.5.

8. A process as defined in claim 6, wherein the P/B ratio is 1/0.6 to 1/2.5.

9. A process as defined in claim 7, wherein the weight ratio of solvent to binder is 2/1 to 6/1.

10. A process as defined in claim 8, wherein the viscosity at the starting stage in the first step is 3 000 to 70 000 cP.

11. A process as defined in claim 9, wherein the solvent amounts to 300 to 1100 parts by weight per 100 parts by weight of the filler.

* * * * *